United States Patent
Ambrosini et al.

(10) Patent No.: US 7,041,145 B2
(45) Date of Patent: May 9, 2006

(54) FUEL COMPRISING AN EMULSION BETWEEN WATER AND A LIQUID HYDROCARBON

(75) Inventors: Tiziano Ambrosini, Settimo Milanese (IT); Attilio Citterio, Milan (IT); Alberto De Amicis, San Donato Milanese (IT); Guido Rivolta, Vigevano (IT)

(73) Assignee: CAM Technologie S.p.A., Pero (IT)

( * ) Notice: Subject to any disclaimer, the term of this patent is extended or adjusted under 35 U.S.C. 154(b) by 2 days.

(21) Appl. No.: 10/482,956

(22) PCT Filed: Jul. 9, 2001

(86) PCT No.: PCT/IT01/00358

§ 371 (c)(1),
(2), (4) Date: Jun. 30, 2004

(87) PCT Pub. No.: WO03/006588

PCT Pub. Date: Jan. 23, 2003

(65) Prior Publication Data

US 2004/0231232 A1    Nov. 25, 2004

(51) Int. Cl.
*C10L 1/18* (2006.01)
*C10L 1/22* (2006.01)
*C10L 1/32* (2006.01)

(52) U.S. Cl. .............. 44/301; 44/302; 44/341; 44/386; 516/27; 516/28; 516/30; 548/100; 548/400; 548/950; 540/484

(58) Field of Classification Search ........... 44/301, 44/302, 341, 386; 516/27, 28, 30; 564/123, 564/133; 548/100, 400, 950; 540/484

See application file for complete search history.

(56) References Cited

U.S. PATENT DOCUMENTS

| 4,152,499 A | 5/1979 | Boerzel et al. |
| 4,509,950 A | 4/1985 | Baker |
| 5,567,344 A | 10/1996 | Emert et al. |
| 5,669,938 A | 9/1997 | Schwab |
| 6,068,670 A | 5/2000 | Haupais et al. |

FOREIGN PATENT DOCUMENTS

| EP | 0 475 620 A2 | | 3/1992 |
| EP | 0 630 398 B1 | | 5/1997 |
| EP | 0 812 615 A2 | | 12/1997 |
| FR | 2 746 106 | | 9/1997 |
| JP | 2000008053 | * | 1/2000 |
| WO | WO 92/19701 | | 11/1992 |
| WO | WO 93/07238 | | 4/1993 |
| WO | WO 95/30722 | | 11/1995 |
| WO | WO 97/34969 | | 9/1997 |
| WO | WO 00/15740 | | 3/2000 |

OTHER PUBLICATIONS

Feb. 24, 2005 Office Action of U.S. Appl. No. 10/169,869.

* cited by examiner

*Primary Examiner*—Cephia D. Toomer
(74) *Attorney, Agent, or Firm*—Finnegan, Henderson, Farabow, Garrett & Dunner, L.L.P.

(57) ABSTRACT

Fuel made from an emulsion between water and a liquid hydrocarbon and polymeric surfactant, used to stabilize the emulsion, obtainable by (a) reacting (i) at least one polyolefin oligomer functionalized with at least one group deriving from a dicarboxylic acid, or a derivative thereof; and (ii) at least one polyoxyalkylene having linear oxyalkylene units, the polyoxyalkylene being linked to a long-chain alkyl group optionally containing at least one ethylenic unsaturation; and (b) reacting the product of step (a) with (ii) at least one nitrogen compound selected from monoamines, polyamines and quaternary ammonium hydroxides. The fuel has high stability over time, without forming carbonaceous deposits adhering to metal surfaces.

48 Claims, No Drawings

FUEL COMPRISING AN EMULSION BETWEEN WATER AND A LIQUID HYDROCARBON

CROSS REFERENCE TO RELATED APPLICATIONS

This application is a national phase application based on PCT/IT01/00358, filed Jul. 9, 2001.

BACKGROUND OF THE INVENTION

1. Field of the Invention

The present invention relates to a fuel comprising an emulsion between water and a liquid hydrocarbon, to a process for fueling a combustion apparatus, and to a polymeric surfactant used to stabilize said emulsion.

2. Description of the Related Art

It is known that the combustion of liquid hydrocarbons, for example for feeding internal combustion engines or for producing heat, leads to the formation of numerous pollutants, in particular soot, particulates, carbon monoxide (CO), nitrogen oxides (NOx), sulphur oxides (SOx), and non-combusted hydrocarbons, which cause a remarkable atmospheric pollution.

It is also known that the addition of controlled amounts of water to a fuel can significantly reduce the production of pollutants. It is believed that this effect is the result of various phenomena arising from the presence of water in the combustion zone. For example, the lowering of the peak combustion temperature by water reduces the emission of nitrogen oxides (NOx), the formation of which is promoted by high temperatures. In addition, the instantaneous vaporization of the water droplets promotes better dispersion of the fuel in the combustion chamber, thereby significantly reducing the formation of soot, particulates and CO. These phenomena take place without adversely affecting the yield for the combustion process.

Several solution have been proposed in attempts to add water to liquid fuel at the time of use, that is to say just before the fuel is injected into the combustion chamber, or directly into the chamber itself. However, these solutions require modifications to be made to the structure of the combustion apparatus and are not capable of achieving optimum dispersion of the water in the fuel, which is an essential requisite for obtaining a significant reduction in pollutants without compromising the calorific yield for the process.

Thus, the most promising and numerous efforts made hitherto were directed towards the formulation of emulsions between liquid hydrocarbons and water in the presence of emulsifiers (surfactants) for the purpose of uniformly dispersing the water in the hydrocarbon phase in the form of droplets of the smallest possible size.

For example, European Patent Application EP-A-475,620 describes microemulsions of a diesel fuel with water, which contain a cetane improver and an emulsifying system comprising a hydrophilic surfactant and a lipophilic surfactant. These surfactants are selected from ethoxylated $C_{12}$–$C_{18}$ alkylammonium salts of a $C_9$–$C_{24}$ carboxylic or sulphonic acid: the hydrophilic surfactant contains at least six ethylene oxide units, while the lipophilic surfactant contains less than six ethylene oxide units.

European Patent Application EP-A-630,398 describes a fuel in the form of an emulsion consisting of a hydrocarbon fuel, from 3 to 35% by weight of water and at least 0.1% by weight of an emulsifying system consisting of a sorbitan oleate, a polyalkylene glycol and an ethoxylated alkylphenol.

International Patent Application WO 97/34969 describes an emulsion between water and a hydrocarbon, for example a diesel fuel. This emulsion is stabilized by adding an emulsifier consisting of a sorbitan sesquioleate, a polyethylene glycol monooleate and an ethoxylated nonylphenol. This emulsifier has an overall HLB (hydrophilic-lipophilic balance) value of from 6 to 8.

A process for producing a stabilized emulsion of a liquid fuel and water is described in European Patent Application EP-A-812,615. This process involves preparing a first emulsion by mixing the fuel, the water and a surfactant, and subsequently mixing the emulsion thus obtained with more water to give the final emulsion. The emulsion is stabilized using a hydrophilic surfactant or a lipophilic surfactant, or a mixture thereof. Lipophilic surfactants which can be used are fatty acid esters of sorbitol, for example sorbitan monooleate, while hydrophilic surfactants which are suitable for this purpose are fatty acid esters of sorbitol containing a polyoxyalkylene chain, for example polyoxyethylene sorbitan trioleate. Further stabilization of the emulsion can be obtained by adding ethylene glycol or a polyethylene glycol.

International Patent Application WO 92/19701 describes a process for reducing the emission of NOx from a gas turbine, in which an emulsion of water with a diesel fuel is used. The emulsion is stabilized by adding an emulsifier selected from: alkanolamides obtained by condensing an alkylamine or hydroxyalkylamine with a fatty acid; and ethoxylated alkylphenols. The emulsifier preferably has an HLB value of less than or equal to 8. Physical stabilizers such as waxes, cellulose derivatives or resins can be added to improve the stability. As described in patent application WO 93/07238, the above emulsion can be further stabilized by adding a difunctional block polymer with a primary hydroxyl end group, in particular a copolymer containing propylene oxide/ethylene oxide blocks.

International Patent Application WO 00/15740 describes an emulsified water-blended fuel composition comprising: (A) a hydrocarbon boiling in the gasoline or diesel range; (B) water; (C) a minor emulsifying amount of at least one fuel-soluble salt made by reacting (C) (I) at least one acylating agent having about 16 to 500 carbon atoms with (C) (II) ammonia and/or at least one amine; and (D) about 0.001 to about 15% by weight of the water-blended fuel composition of a water soluble, ashless, halogen-, boron-, and phosphorus-free, amine salt, distinct from component (C). The acylating agent (C) (I) includes carboxylic acids and their reactive equivalents such as acid halides, anhydrides, and esters, including partial esters and triglycerides.

On the basis of the Applicant's experience, the chances of success in the use of fuels in the form of an emulsion between water and a liquid hydrocarbon are mainly associated with the possibility of replacing a conventional liquid fuel with an emulsified fuel without the need for any structural changes to the combustion apparatus and without adversely affecting the correct functioning of this apparatus.

In particular, the fuel in the emulsion form requires high stability over time in a broad temperature range (for example for at least three months under normal storage conditions, i.e. from −20° C. to +50° C.), so as to avoid, during residence in tanks, the formation of a water-rich phase which tends to become deposited at the bottom of the tank. Feeding this aqueous phase into the combustion chamber would bring about a considerable impairment in the performance level of the engine, or even permanent damage thereto.

In addition, the Applicant has found that the addition of emulsifiers to improve the stability of the emulsion can lead, during combustion, to the formation of carbonaceous deposits which adhere to the internal surface of the combustion chamber and to the injectors. This phenomenon can adversely affect the running of the engine, as a result of which frequent maintenance is necessary to remove these deposits.

SUMMARY OF THE INVENTION

The Applicant has now found that fuels comprising an emulsion between water and a liquid hydrocarbon can be produced using a polymer surfactant as defined below as emulsifier. The fuel thus obtained displays high stability over time in a broad temperature range, without forming carbonaceous deposits adhering to the metal surfaces.

In a first aspect, the present invention thus relates to a fuel comprising an emulsion between water and a liquid hydrocarbon, said emulsion being stabilized by at least one emulsifier, characterized in that the said emulsifier comprises a polymeric surfactant obtainable by:
  (a) reacting (i) at least one polyolefin oligomer functionalized with at least one group deriving from a dicarboxylic acid, or a derivative thereof; and (ii) at least one polyoxyalkylene comprising linear oxyalkylene units, said polyoxyalkylene being linked to a long-chain alkyl group optionally containing at least one ethylenic unsaturation; and
  (b) reacting the product of step (a) with (iii) at least one nitrogen compound selected from: monoamines, polyamines and quaternary ammonium hydroxides.

In a further aspect, the present invention relates to a process for fueling a combustion apparatus comprising at least one combustion chamber, comprising:
feeding a fuel to said at least one combustion chamber;
igniting said fuel in said at least one combustion chamber;
wherein said fuel comprises an emulsion between water and a liquid hydrocarbon as described above.

Preferably, said combustion apparatus is an internal combustion engine.

According to a further aspect, the present invention relates to a polymeric surfactant obtainable by:
  (a) reacting (i) at least one polyolefin oligomer functionalized with at least one group deriving from a dicarboxylic acid, or a derivative thereof; and (ii) at least one polyoxyalkylene comprising linear oxyalkylene units, said polyoxyalkylene being linked to a long-chain alkyl group optionally containing at least one ethylenic unsaturation; and
  (b) reacting the product of step (a) with (iii) at least one nitrogen compound selected from: monoamines, polyamines and quaternary ammonium hydroxides.

DETAILED DESCRIPTION OF THE INVENTION

Preferably, the polyolefin oligomer has an average molecular weight of from 300 to 10,000, preferably from 500 to 5,000.

The polyolefin oligomer is generally obtained by homopolymerization or copolymerization of at least one olefin containing from 2 to 16 carbon atoms, selected, for example, from:

α-olefins, i.e. olefins in which the double bond is in the terminal position, such as: ethylene, propylene, 1-butene, isobutene, 4-methyl-1-pentene, 1-hexene, 1-octene, 2-methyl-1-heptene and the like;

internal monoolefins, i.e. olefins in which the double bond is not in a terminal position, such as: 2-butene, 3-pentene, 4-octene and the like.

The said olefins can moreover be copolymerized with other hydrocarbons containing at least one ethylenic unsaturation, such as monovinylarenes (for example styrene, p-methylstyrene and the like) or conjugated dienes (for example 1,3-butadiene, isoprene, 1,3-hexadiene and the like).

Preferably, the polyolefin oligomer derives from the polymerization of mixtures of olefins containing 4 carbon atoms, generally containing from 35 to 75% by weight of 1-butene and from 30 to 60% by weight of isobutene, in the presence of a Lewis acid as catalyst, for example aluminium trichloride or boron trifluoride. These polymerization products are generally known as "polyisobutenes" since they mainly contain isobutene repeating units of formula:

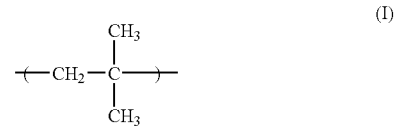

(I)

The amount of isobutene units is usually not less than 80 mol %.

The polyoxyalkylene comprises linear oxyalkylene units which impart hydrophilic properties, in particular units of formula —CH$_2$CH$_2$O—, —CH$_2$CH$_2$CH$_2$O— or —CH$_2$CH$_2$CH$_2$CH$_2$O—, or mixtures thereof.

The number of linear oxyalkylene units is predetermined mainly as a function of the nature and length of the lipophilic portions present in the polymeric surfactant, in particular of the polyolefin oligomer and the long-chain alkyl group.

Preferably, the polyoxyalkylene is a polyoxyethylene containing from 2 to 40, preferably from 5 to 20, oxyethylene units of formula —CH$_2$CH$_2$O—.

Alternatively, the polyoxyalkylene is a copolymer containing from 2 to 30, preferably from 5 to 15, oxyethylene units of formula —CH$_2$CH$_2$O—, and not more than 12, preferably from 1 to 10, branched oxyethylene units of formula:

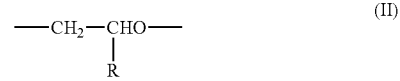

(II)

wherein R is an alkyl containing from 1 to 3 carbon atoms. Preferably, R is methyl.

In the case of copolymers, the oxyalkylene units are distributed along the chain randomly, in blocks or alternately. The number of oxyalkylene units is expressed as the average number of units per chain.

The polyoxyalkylene is linked to a long-chain alkyl group. This alkyl group, of linear or branched structure, optionally containing at least one ethylenic unsaturation, generally contains from 8 to 24 carbon atoms.

The link between the polyoxyalkylene and the long-chain alkyl group is preferably made by an ester group or an ether group, and can be obtained by:

(A) condensing a polyoxyalkylene (polyalkylene glycol) with a fatty acid or a derivative thereof, in particular an ester, with formation of the corresponding polyoxyalkylene monoester;

(B) esterification of a fatty alcohol with an alkylene oxide, in particular with ethylene oxide or mixtures of ethylene oxide and propylene oxide.

Examples of fatty acids which can be used in reaction (A) are: myristoleic acid, palmitoleic acid, oleic acid, gadoleic acid, erucic acid, ricinoleic acid, linoleic acid, linolenic acid, arachidonic acid, lauric acid, myristic acid, palmitic acid, stearic acid, behenic acid and the like, or mixtures thereof.

Examples of fatty alcohols which can be used in reaction (B) are: octyl alcohol, decyl alcohol, lauryl alcohol, myristyl alcohol, cetyl alcohol, octadecyl alcohol, oleyl alcohol, linoleyl alcohol, linolenyl alcohol and the like, or mixtures thereof.

The polyolefin oligomer is functionalized by reaction with a dicarboxylic acid, or a derivative thereof. In particular, the functionalization can be carried out by:

(i) concerted reaction of "ene" type between the polyolefin oligomer containing at least one ethylenic unsaturation and a dicarboxylic acid derivative containing an ethylenic unsaturation;

(ii) anionic condensation reaction between the polyolefin oligomer functionalized with a leaving group (for example a halogen atom or a tosyl or mesyl group) and a saturated dicarboxylic acid derivative.

In both cases, acyl halides (preferably chlorides or bromides), $C_1$–$C_4$ esters or, preferably, anhydrides can be used as dicarboxylic acid derivatives.

The dicarboxylic acid containing an ethylenic unsaturation can be selected, for example, from: maleic acid, fumaric acid, citraconic acid, itaconic acid and the like, or mixtures thereof.

The saturated dicarboxylic acid can be selected, for example, from: malonic acid, succinic acid, glutaric acid, adipic acid, 2-hexene-1,6-dioic acid, azelaic acid and the like, or mixtures thereof.

Preferably, the functionalized polyolefin oligomer derives from the reaction between maleic anhydride and a polyisobutene containing not less than 65 mol %, preferably not less than 80 mol %, of exo double bonds, i.e. vinylidene groups of formula:

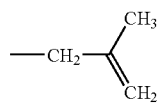

(III)

Polyisobutenes of this type are available, for example, under the brand names Ultravis® (BP Amoco Chemicals) and Glissopal® (BASF).

Further details regarding the preparation of polyolefin oligomers functionalized as described above are given, for example, in U.S. Pat. Nos. 4,152,499 and 5,567,344.

The condensation reaction of step (a) between the functionalized polyolefin oligomer and the polyoxyalkylene bonded to a long-chain alkyl group can be carried out in bulk or in the presence of an organic solvent. Preferably, for the purpose of helping to remove the water deriving from the condensation, the organic solvent is selected from those which form an azeotrope with water, for example toluene or xylene, or mixtures thereof. The condensation reaction can be carried out at a temperature which is generally not greater than 200° C. When an organic solvent is used, the reaction temperature is usually not greater than the boiling point of this solvent. The reaction time can vary within a wide range, generally from 3 to 24 hours.

As to step (b), it is carried out by reacting the product of step (a) with (iii) at least one nitrogen compound selected from: monoamines, polyamines and quaternary ammonium hydroxides.

The monoamines have only one amine functionality, and can be primary, secondary or tertiary amines of formula:

(IV)

wherein R1, R2 and R2, equal or different from each other, are selected from: hydrogen; C1–C24 hydrocarbyl group, optionally substituted with at least one group selected from hydroxy and C1–C4 alkoxy; R1 and R2 may be linked to form a nitrogen-containing aliphatic heterocyclic ring, optionally containing at least one additional heteroatom (e.g. nitrogen and/or oxygen); with the proviso that at least one of R1, R2 and R3 is different from hydrogen.

The hydrocarbyl group may be an aliphatic, cycloaliphatic, aromatic and/or heterocyclic group, linear or branched, saturated or unsaturated.

Specific examples of aliphatic monoamines include: trimethylamine, ethylamine, diethylamine, triethylamine, tripropylamine, n-butylamine, di-n-butylamine, tributylamine, methyldiethylamine, ethyldimethylamine, dimethylpropylamine, dimethylhexylamine, dimethyloctylamine, allylamine, isobutylamine, dimethylpentylamine, cocoamine, stearylamine, laurylamine, methyllaurylamine, oleylamine, N-methyloctylamine, dodecylamine, octadecylamine, or mixtures thereof.

Specific examples of cycloaliphatic monoamines include: cyclohexylamine, cyclopentylamine, cyclohexenylamine, cyclopentenylamine, N-ethyl-cyclohexylamine, dicyclohexylamine, or mixtures thereof.

Specific examples of hydroxyl-substituted amines (known also as hydroxyamines or alkanolamines) includes: ethanolamine, diethanolamine, ethylethanolamine, dimethylethanolamine, diethylethanolamine, di-(3-hydroxypropyl) amine, N-(3-hydroxybutyl)amine, N-(4-hydroxybutyl) amine, N,N-di-(2-hydroxypropyl)amine, N-(2-hydroxyethyl)morpholine, N-(2-hydroxylethyl) cyclohexylamine, N-3-hydroxyl-cyclopentylamine, N-(hydroxyethyl)piperazine, or mixtures thereof.

Specific examples of aromatic monoamines includes: phenylethylamine, benzyldimethylamine, or mixtures thereof.

The polyamines may be aliphatic or cycloaliphatic compounds. Particularly preferred are alkylene polyamines of formula:

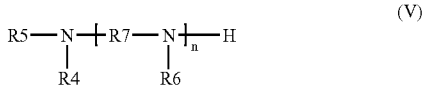

wherein:

n is from 1 to 10, preferably from 2 to 7;

R4, R5 and R6, equal or different from each other, are selected from: hydrogen, alkyl or hydroxy-substituted alkyl group having from 1 to 30 carbon atoms, with the proviso that at least one of R4 and R5 and at least one of R6 is hydrogen;

R7 is an alkylene group having from 1 to 18, preferably from 2 to 6, carbon atoms.

Specific examples of polyamines includes: methylene polyamines, ethylene polyamines, butylene polyamines, propylene polyamines, pentylene polyamines, ethylene diamine, triethylene tetramine, propylene diamine, trimethylene diamine, tripropylene tetramine, tetraethylene pentamine, hexaethylene heptamine, pentaethylene hexamine, or mixtures thereof.

The quaternary ammonium hydroxides can be represented by the following formula:

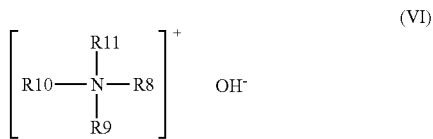

wherein:

R8, R9, R10 and R11, equal or different from each other, are selected from: C1–C24 hydrocarbyl group, optionally substituted with at least one group selected from hydroxy and C1–C4 alkoxy; R8 and R9 may be linked to form a nitrogen-containing aliphatic heterocyclic ring, optionally containing at least one additional heteroatom (e.g. nitrogen and/or oxygen).

The hydrocarbyl group may be an aliphatic, cycloaliphatic, aromatic and/or heterocyclic group, linear or branched, saturated or unsaturated.

Specific examples of quaternary ammonium hydroxides include: tetramethylammonium hydroxide, tetraethylammonium hydroxide, tetrapropylanmonium hydroxide, tetrabutylammonium hydroxide, benzyltrimethylammonium hydroxide, capryltrimethylammonium hydroxide, oleyltrimethylammonium hydroxide, hydroxyethyltributylammonium hydroxide, methoxyethyltributylammonium hydroxide, or mixtures thereof.

The reaction of step (b) can be carried out by mixing the reactants in bulk or in the presence of an inert organic solvent, e.g. xylene or toluene. The reaction temperature may vary within a wide range, usually from about 20° C. to about 180° C. The reaction temperature is usually not greater than the boiling point of the nitrogen compound (iii) and, when an organic solvent is used, not greater than the boiling point of the solvent. The reaction time can vary within a wide range, generally from 0.5 to 5 hours.

The product resulting from the reaction step (b) includes a carboxylate ammonium salt or an amide, or a mixture thereof, which derive from the reaction of the nitrogen compound (iii) with the residual carboxylic groups which are present in the product of step (a). The yield of salt and/or amide mainly depends on the specific reactants and on the reaction conditions, particularly the reaction temperature and time.

The equivalent ratio between the product of step (a) and the nitrogen compound (iii) may be varied over a wide range. Generally, the equivalent ratio may vary from 0.5 to 4, a ratio of about 1 being preferred. The number of equivalents for the product of step (a) corresponds to the number of residual carboxylic groups, and may be determined according to known techniques, e.g. by acid number (usually expressed as mg KOH/g of product). The number of equivalents for the nitrogen compound (iii) is the molecular weight of the compound (iii) divided by the total number of basic nitrogen atoms present in the molecule.

The amount of polymeric surfactant to be used in the fuel according to the present invention is predetermined mainly as a function of the amount of water to be emulsified and the type of liquid hydrocarbon used. Preferably, the polymeric surfactant as defined above is present in the fuel in an amount of from 0.1 to 5% by weight, preferably from 0.5 to 3% by weight, relative to the total weight of the fuel.

It should be noted that the polymeric surfactant as defined above is capable of effectively stabilizing the emulsion over a broad temperature range without the addition of further emulsifiers. However, this is not to exclude the possibility of adding other products which may in some way modify the stability of the emulsion, in particular other emulsifiers known in the art.

The type of emulsion obtainable by using the polymeric surfactant as defined above is generally of the water-in-oil type, wherein the water droplets are dispersed in the continuous hydrocarbon phase. It is believed that this type of emulsion ensures maximum efficiency in the reduction of pollutants on account of the water present during the combustion phase.

The fuel according to the present invention includes a liquid hydrocarbon, generally deriving from the distillation of petroleum and consisting essentially of mixtures of aliphatic, naphthenic, olefinic and/or aromatic hydrocarbons. The liquid hydrocarbon generally has a viscosity at 40° C. of from 1 to 53 cSt, and a density at 15° C. of from 0.75 to 1.1 kg/dm$^3$, and can be selected, for example, from: gas oils for use as automotive fuels or for production of heat, fuel oils, kerosenes, aviation fuels (Jet Fuels).

The amount of water to be emulsified with the liquid hydrocarbon is determined so as to obtain the desired reduction in pollutants without, however, impairing the calorific yield for the combustion process. This amount is generally from 3 to 40% by weight, preferably from 7 to 20% by weight, relative to the total weight of the fuel. The water used can be of any type, for example industrial or domestic mains water. However, it is preferred to use demineralized or deionized water, in order to avoid the formation of mineral deposits on the internal surface of the combustion chamber and/or on the injectors.

The fuel according to the present invention can contain other additives, whose nature and amount depend on the specific use for which the fuel is intended. These additives can be selected, for example, from: cetane improvers, corrosion inhibitors, lubricants, biocides, antifoaming agents, antifreezes, and mixtures thereof.

In particular, the cetane improvers are products which improve the detonating properties of the fuel, and are generally selected from nitrates, nitrites and peroxides of the organic or inorganic type, which are soluble in the aqueous phase or, preferably, soluble in the hydrocarbon phase, such as organic nitrates (see for example patents EP-475,620 and U.S. Pat. No. 5,669,938). Of preferred use are alkyl or cycloalkyl nitrates containing up to 10 carbon atoms, such as: ethyl nitrate, amyl nitrates, n-hexyl nitrate, 2-ethylhexyl nitrate, n-decyl nitrate, cyclohexyl nitrate and the like, or mixtures thereof.

The biocides can be selected from those known in the art, such as morpholine derivatives, isothiazolin-3-one derivatives, tris(hydroxymethyl)-nitromethane, formaldehyde, oxazolidines, or mixtures thereof.

The fuel according to the present invention can also include an alcohol, which, by lowering the freezing point of the aqueous phase, serves mainly as an antifreeze. Alcohols which are suitable for this purpose are, for example: methanol, ethanol, isopropanol and glycols, or mixtures thereof. The amount of alcohol is generally from 0.5 to 8% by weight, preferably from 1 to 4% by weight, relative to the total weight of the fuel.

The fuel according to the present invention is generally prepared by mixing the components using an emulsifying device known in the art, in which the formation of the emulsion can result from a mechanical-type action exerted by moving parts, or from passing the components to be emulsified into mixing devices of static type, or alternatively from a combined mechanical and static action. The emulsion is formed by feeding the aqueous phase and the hydrocarbon phase, optionally premixed, into the emulsifying device. The emulsifier and the other additives which may be present can be introduced separately or, preferably, premixed either in the aqueous phase or in the hydrocarbon phase depending on their solubility properties. Preferably, the polymeric surfactant is premixed in the hydrocarbon phase.

The present invention will now be further illustrated by means of some working examples.

EXAMPLE 1

A. Preparation of Polyethylene Glycol Monoester (PEG-monoester)

300 g of an oleic acid/linoleic acid mixture in a 60/40 weight ratio and 400 g of polyethylene glycol (PEG) (molecular weight (MW): 400 g/mol) were mixed together in a reactor. 3.5 g of methanesulphonic acid as condensation catalyst and 340 ml of toluene as diluent (forming an azeotrope with $H_2O$) were added under stirring. The mixture was heated gradually to 140° C. for a total time of about 5 hours, with distillation and separation of the $H_2O$/toluene azeotrope. After further heating at 160° C. for 2 hours with distillation of the residual toluene, the resulting product was degassed under vacuum for about 2 hours at 140° C. The residual acidity was 4.5 mg of KOH per gram of product.

B. Synthesis of the Polyisobutene Derivative by Reaction with Maleic Anhydride 95 g of polyisobutene (PIB) (average MW: 950 g/mol) with an exo double bond content $\geq 90\%$ (Ultravis® 10 from BP Amoco Chemicals), 9.4 g of maleic anhydride and 37 ml of xylene were loaded into a 500 ml Teflon® autoclave. After degassing with nitrogen, the autoclave was heated to a temperature of 190° C. and kept at this temperature for a total of 22 hours. At the end of the reaction, the autoclave was cooled to 70° C. and degassed under vacuum for about 2 hours. The product thus obtained (101 g), a viscous yellow liquid, had a polyisobutene conversion yield equal to about 43% (determined by chromatography on silica using hexane as eluant), a maleic anhydride residual content lower than 0.2% wt, and an anhydride number (number of moles of bonded anhydride per 100 g of product) (determined by quantitative infrared spectroscopic analysis, based on the absorption peak at 1760 $cm^{-1}$) of 0.052.

C. Synthesis of the Intermediate Ester (Step (a))

The PIB functionalized with maleic anhydride obtained from reaction B (52.6 g) was loaded into a reactor and heated to about 50° C., followed by addition, with stirring, of xylene (5 g) and the PEG-monoester obtained from reaction A (75 g). The solution obtained was heated at 140° C. for 1 hour. The temperature was then maintained at 180° C. for 10 hours, with distillation and separation of the $H_2O$/xylene azeotrope. The product thus obtained, a slightly brown-coloured viscous liquid, had a residual acidity of 5.1 mg of KOH per gram of product.

D. Synthesis of the Polymeric Surfactant (Step (b))

D1. The product obtained in Step C was reacted with 1.45 g (=1 equivalent) of diethanolamine by stirring for 1 hour at 30° C. The resulting polymeric surfactant was a slightly brown viscous liquid, with a residual acidity of about 0.3 mg of KOH per gram of product.

D2. The product obtained in Step C was reacted with 1.45 g (=1 equivalent) of diethanolamine by stirring for 4 hour at 140° C. while stripping water under vacuum. The resulting polymeric surfactant was a slightly brown viscous liquid, with a residual acidity of about 0.3 mg of KOH per gram of product.

D3. The product obtained in Step C was reacted with 5.55 g (=1 equivalent) of a 40% by weight aqueous solution of benzyltrimethylammonium hydroxide by stirring for 1 hour at 30° C. The resulting polymeric surfactant was a slightly brown viscous liquid, with a residual acidity of less than 0.1 mg of KOH per gram of product.

EXAMPLE 2

1000 g of an emulsion between diesel fuel and water were prepared using the product of reaction D1 as emulsifier.

18.87 g of the emulsifier obtained in Example 1-D1 were added to 865 g of automotive diesel fuel of EN590 type, to which 0.565 g of 2-ethylhexyl nitrate (cetane improver) had been added beforehand. The mixture was subjected to the action of a high shear mixer for a few minutes, followed by addition of 115.00 g of water to which 0.565 g of a bactericide (isothiazolin-3-one derivative) had been added beforehand. The emulsifier was then switched to the maximum stirring speed for about 3 minutes. An emulsion having the composition below was thus obtained:

| diesel fuel | 86.5% | by weight |
| water | 11.5% | " |
| emulsifier | 1.887% | " |
| cetane improver | 0.0565% | " |
| bactericide | 0.0565% | " |

EXAMPLE 3

1000 g of an emulsion between diesel fuel and water were prepared by following the same procedure of Example 2, except that as emulsifier the product of Example 1-D2 was used.

EXAMPLE 4

1000 g of an emulsion between diesel fuel and water were prepared by following the same procedure of Example 2, except that as emulsifier the product of Example 1-D3 was used.

EXAMPLE 5 (COMPARATIVE)

1000 g of emulsion were prepared according to the same procedure as that described in Example 2, the only difference being the use, instead of the emulsifier of Example 1, of 18.87 g of a surfactant mixture consisting of 87% by weight of sorbitan monooleate, 3% by weight of sorbitan trioleate and 10% by weight of ethoxylated castor oil (10 mol of ethylene oxide).

EXAMPLE 6

The emulsions prepared according to Examples 2–5 were characterized as follows.

Stability on Centrifugation.

The stability of the emulsions was evaluated by centrifugation. Two series of tests were carried out, the first with freshly prepared emulsions (t=0) and the second after storing the emulsions at room temperature for 24 hours (t=24 h).

A graduated test tube was filled with 15 ml of emulsion. The test tube was placed in a centrifuge running at 4000 revolutions/min (equal to 2525 g; g=gravity acceleration) for a total time of 30 min, at room temperature. The amount, expressed as % by volume, of water-rich phase which separated at the bottom of the test tube (creaming) was measured at regular intervals of 5 minutes of centrifugation.

The results for the emulsions of Examples 2–5 are given in Table 1.

Static Stability Under Temperature Cycle.

The storage stability of the emulsions was evaluated by the following method.

A 1000 ml glass cylinder filled with the test emulsion was placed in a thermostatically-controlled oven whose temperature was controlled according to the following temperature cycle: 8 hours at 40° C., 8 hours at 20° C., 8 hours at 5° C. The emulsion was subjected to this temperature cycle for 14 days. 15 ml samples were then taken from the top and the bottom of the emulsion, and were used to determine the water content by means of Karl-Fisher titration according to ISO standard 3734. The same measurements were carried out on a sample subjected to the temperature cycle for 28 days.

The results for the emulsions of Examples 2–5 are given in Table 2 (values averaged over three samples).

As can be seen from the data given in Tables 1 and 2, the emulsions according to the invention shows high stability to centrifugation and to the temperature cycles, whereas in the emulsion according to the prior art, the aqueous phase tends to settle in large amounts.

Formation of Deposits on Metal Plate.

A stainless steel plate (10 cm×5 cm) was placed on a heating plate maintained at a temperature of about 280–300° C. On reaching this temperature, one drop of emulsion was placed on the steel plate every 30 seconds, for a total of 10 drops. After depositing the final drop, the plate was cooled for a further 30 seconds. The formation of a carbonaceous deposit was observed on the plate. The test is to be considered as positive if this deposit can be easily wiped off in a substantially complete manner by rubbing with a dry cloth, while the test is negative if much of the deposit still sticks to the plate even after prolonged rubbing.

The test carried out with the emulsions according to the invention (Ex. 2–4) gave a positive result, with formation of a thin deposit which was easily removed by rubbing. In contrast, the comparative emulsion (Ex. 5) failed the test, since it formed a dark deposit which could not be removed by rubbing.

Lubricity. Corrosion.

Compared with diesel fuel as such, the emulsion according to the invention (Ex. 2–4) showed a lubricity (measured according to ISO standard 12156/1) of about 270 μm, compared with a value of about 385 μm for diesel fuel as such. Thus, the emulsion according to the invention has better anti-grip capacity than diesel fuel as such.

Evaluation of the corrosion according to standard EN590 classified the emulsion according to the invention in Class 1a, equal to that of diesel fuel as such.

TABLE 1

| Emulsion | | t = 0 | | | | | |
|---|---|---|---|---|---|---|---|
| Ex. 2 (inv.) | centrif. time (min) | 5 | 10 | 15 | 20 | 25 | 30 |
| | creaming (% vol) | 0.50 | 1.10 | 1.75 | 2.32 | 2.60 | 3.02 |
| | | t = 24 h | | | | | |
| | centrif. time (min) | 5 | 10 | 15 | 20 | 25 | 30 |
| | creaming (% vol) | 0.50 | 0.81 | 1.51 | 1.76 | 2.24 | 2.70 |
| Emulsion | | t = 0 | | | | | |
| Ex. 3 (inv.) | centrif. time (min) | 5 | 10 | 15 | 20 | 25 | 30 |
| | creaming (% vol) | 0.53 | 1.30 | 1.87 | 2.60 | 2.91 | 3.54 |
| | | t = 24 h | | | | | |
| | centrif. time (min) | 5 | 10 | 15 | 20 | 25 | 30 |
| | creaming (% vol) | 0.55 | 0.96 | 1.71 | 2.00 | 2.61 | 3.29 |
| Emulsion | | t = 0 | | | | | |
| Ex. 4 (inv.) | centrif. time (min) | 5 | 10 | 15 | 20 | 25 | 30 |
| | creaming (% vol) | 0.40 | 0.90 | 1.67 | 2.12 | 2.39 | 2.86 |
| | | t = 24 h | | | | | |
| | centrif. time (min) | 5 | 10 | 15 | 20 | 25 | 30 |
| | creaming (% vol) | 0.42 | 0.74 | 1.42 | 1.67 | 2.04 | 2.51 |
| Emulsion | | t = 0 | | | | | |
| Ex. 5 (comp.) | centrif. time (min) | 5 | 10 | 15 | 20 | 25 | 30 |
| | creaming (% vol) | 3.33 | 6.00 | 6.67 | 8.00 | 9.00 | 9.67 |
| | | t = 24 h | | | | | |
| | centrif. time (min) | 5 | 10 | 15 | 20 | 25 | 30 |
| | creaming (% vol) | 6.67 | 9.33 | 10.00 | 10.33 | 10.67 | 11.00 |

TABLE 2

| Emulsion | Time (days) | $H_2O$ content at the top (% by weight) | $H_2O$ content at the bottom (% by weight) |
|---|---|---|---|
| Ex. 2 (inv.) | 0 | 11.54 | |
| | 14 | 11.19 | 12.22 |
| | 28 | 11.09 | 12.99 |
| Ex. 3 (inv.) | 0 | 11.56 | |
| | 14 | 11.05 | 12.26 |
| | 28 | 11.00 | 13.31 |
| Ex. 4 (inv.) | 0 | 11.62 | |
| | 14 | 11.33 | 12.24 |
| | 28 | 11.23 | 12.67 |

TABLE 2-continued

| Emulsion | Time (days) | H₂O content at the top (% by weight) | H₂O content at the bottom (% by weight) |
|---|---|---|---|
| Ex. 5 (comp.) | 0 | 10.92 | |
| | 14 | 6.06 | 42.31 |
| | 28 | 1.74 | 62.46 |

The invention claimed is:

1. A fuel comprising an emulsion between water and a liquid hydrocarbon, said emulsion being stabilized by at least one emulsifier comprising a polymeric surfactant obtained by:
  (a) reacting (i) at least one polyolefin oligomer functionalized with at least one group derived from a dicarboxylic acid, or a derivative thereof; and (ii) at least one polyoxyalkylene comprising linear oxyalkylene units, said polyoxyalkylene being linked to a long-chain alkyl group optionally containing at least one ethylenic unsaturation, said long-chain alkyl group having at least 8 carbons; and
  (b) reacting the product of step (a) with (iii) at least one nitrogen compound selected from monoamines, polyamines and quaternary ammonium hydroxides.

2. The fuel according to claim 1, wherein the polyolefin oligomer has an average molecular weight from 300 to 10,000.

3. The fuel according to claim 2, wherein the polyolefin oligomer has an average molecular weight from 500 to 5,000.

4. The fuel according to claim 1, wherein the polyolefin oligomer derives from polymerization of mixtures of olefins having 4 carbon atoms, and mainly contains isobutene repeating units of the formula:

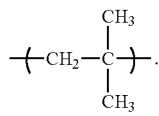

5. The fuel according to claim 1, wherein the polyoxyalkylene comprises linear oxyalkylene units selected from —CH₂CH₂O—, —CH₂CH₂CH₂O—, —CH₂CH₂CH₂CH₂O—, or mixtures thereof.

6. The fuel according to claim 5, wherein the polyoxyalkylene comprises from 2 to 40 oxyethylene units of formula —CH₂CH₂O—.

7. The fuel according to claim 6, wherein the polyoxyethylene comprises from 5 to 20 oxyethylene units.

8. The fuel according to claim 1, wherein the polyoxyalkylene is a copolymer having from 2 to 30 oxyethylene units of formula —CH₂CH₂O—, and not more than 12 branched oxyethylene units of the formula:

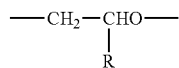

wherein R is an alkyl having from 1 to 3 carbon atoms.

9. The fuel according to claim 8, wherein R is methyl.

10. The fuel according to claim 1, wherein the polyoxyalkylene is linked to a long-chain alkyl group of linear or branched structure, optionally containing at least one ethylenic unsaturation, having from 8 to 24 carbon atoms.

11. The fuel according to claim 10, wherein the polyoxyalkylene is linked to the long-chain alkyl group via an ester group.

12. The fuel according to claim 10, wherein the polyoxyalkylene is linked to the long-chain alkyl group via an ether group.

13. The fuel according to claim 1, wherein the polyolefin oligomer is functionalized by reaction with a dicarboxylic acid derivative selected from acyl halides, C₁–C₄ esters and anhydrides.

14. The fuel according to claim 1, wherein the functionalized polyolefin oligomer is obtained by reaction between maleic anhydride and a polyisobutene containing not less than 65% of exo double bonds.

15. The fuel according to claim 1, wherein the nitrogen compound (iii) is a primary, secondary or tertiary amine of the formula:

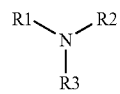

wherein R1, R2 and R3, equal or different from each other, are selected from hydrogen; C₁–C₂₄ hydrocarbyl groups, optionally substituted with at least one group selected from hydroxyl and C₁–C₄ alkoxy; R1 and R2 may be linked to form a nitrogen-containing aliphatic heterocyclic ring, optionally containing at least one additional heteroatom; with the proviso that at least one of R1, R2 and R3 is different from hydrogen.

16. The fuel according to claim 1, wherein the nitrogen compound (iii) is an alkylene polyamine of the formula:

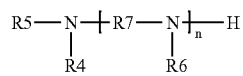

wherein n is from 1 to 10; R4, R5 and R6, equal or different from each other, are selected from hydrogen, alkyl or hydroxyl-substituted alkyl group having from 1 to 30 carbon atoms, with the proviso that at least one of R4 and R5 and at least one of R6 is hydrogen; and
R7 is an alkylene group having from 1 to 18 carbon atoms.

17. The fuel according to claim 16, wherein R7 is an alkylene group having from 2 to 6 carbon atoms and/or n is from 2 to 7.

18. The fuel according to claim 1, wherein the nitrogen compound (iii) is a quaternary ammonium hydroxide of the formula:

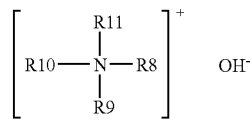

wherein R8, R9, R10 and R11, equal or different from each other, are selected from C₁–C₂₄ hydrocarbyl groups, optionally substituted with at least one group selected from hydroxyl and C₁–C₄ alkoxy; and R8 and R9 may be linked to form a nitrogen-containing aliphatic heterocyclic ring, optionally containing at least one additional heteroatom.

19. The fuel according to claim 1, wherein the polymeric surfactant is present in an amount from 0.1 to 5% by weight relative to the total weight of the fuel.

20. The fuel according to claim 19, wherein the polymeric surfactant is present in an amount from 0.5 to 3% by weight relative to the total weight of the fuel.

21. The fuel according to claim 1, wherein the liquid hydrocarbon has a viscosity at 40° C. from 1 to 53 cSt and a density at 15° C. from 0.75 to 1.1 kg/dm³.

22. The fuel according to claim 1, wherein the water is present in an amount from 3 to 40% by weight relative to the total weight of the fuel.

23. The fuel according to claim 22, wherein the water is present in an amount from 7 to 20% by weight relative to the total weight of the fuel.

24. The fuel according to claim 1, further comprising at least one cetane improver.

25. The fuel according to claim 24, wherein said at least one cetane improver is selected from inorganic nitrates, inorganic nitrites and inorganic peroxides.

26. The fuel according to claim 24, wherein said at least one cetane improver is selected from organic nitrates, organic nitrites and organic peroxides.

27. The fuel according to claim 1, further comprising at least one biocide.

28. The fuel according to claim 1, further comprising at least one alcohol.

29. The fuel according to claim 28, wherein the alcohol is selected from methanol, ethanol, isopropanol and glycols, or mixtures thereof.

30. The fuel according to claim 28, wherein the alcohol is present in an amount from 0.5 to 8% by weight relative to the total weight of the fuel.

31. The fuel according to claim 30, wherein the alcohol is present in an amount from 1 to 4% by weight relative to the total weight of the fuel.

32. A process for fueling a combustion apparatus comprising at least one combustion chamber, comprising: feeding a fuel to said at least one combustion chamber; igniting said fuel in said at least one combustion chamber; wherein said fuel comprises an emulsion between water and a liquid hydrocarbon said emulsion being stabilized by at least one emulsifier comprising a polymeric surfactant obtained by:
(a) reacting (i) at least one polyolefin oligomer functionalized with at least one group derived from a dicarboxylic acid, or a derivative thereof; and (ii) at least one polyoxyalkylene comprising linear oxyalkylene units, said polyoxyalkylene being linked to a long-chain alkyl group optionally containing at least one ethylenic unsaturation, said long-chain alkyl group containing at least 8 carbons; and
(b) reacting the product of step (a) with (iii) at least one nitrogen compound selected from: monoamines, polyamines and quaternary ammonium hydroxides.

33. The process according to claim 32, wherein said combustion apparatus is an internal combustion engine.

34. A polymeric surfactant obtained by:
(a) reacting (i) at least one polyolefin oligomer functionalized with at least one group derived from a dicarboxylic acid, or a derivative thereof; and (ii) at least one polyoxyalkylene comprising linear oxyalkylene units, said polyoxyalkylene being linked to a long-chain alkyl group optionally containing at least one ethylenic unsaturation, said long-chain alkyl group containing at least 8 carbons; and (b) reacting the product of step (a) with (iii) at least one nitrogen compound selected from monoamines, polyamines and quaternary ammonium hydroxides.

35. The polymeric surfactant according to claim 34, wherein the polyolefin oligomer has an average molecular weight from 300 to 10,000.

36. The polymeric surfactant according to claim 34, wherein the polyolefin oligomer derives from the polymerization of mixtures of olefins having 4 carbon atoms, and mainly contains isobutene repeating units of the formula:

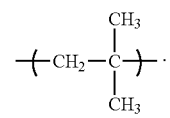

37. The polymeric surfactant according to claim 34, wherein the polyoxyalkylene, comprises linear oxyalkylene units selected from —$CH_2CH_2O$—, —$CH_2CH_2CH_2O$—, —$CH_2CH_2CH_2CH_2O$—, or mixtures thereof.

38. The polymeric surfactant according to claim 37, wherein the polyoxyalkylene comprises 2 to 40 oxyethylene units of the formula —$CH_2CH_2O$—.

39. The polymeric surfactant according to claim 38, wherein the polyoxyethylene comprises from 5 to 20 oxyethylene units.

40. The polymeric surfactant according to claim 34, wherein the polyoxyalkylene is a copolymer having from 2 to 30 oxyethylene units of the formula —$CH_2CH_2O$—, and not more than 12 branched oxyethylene units of the formula:

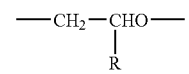

wherein R is an alkyl having from 1 to 3 carbon atoms.

41. The polymeric surfactant according to claim 34, wherein the polyoxyalkylene is linked to a long-chain alkyl group, of linear or branched structure, optionally containing at least one ethylenic unsaturation, having from 8 to 24 carbon atoms.

42. The polymeric surfactant according to claim 41, wherein the polyoxyalkylene is linked to the long-chain alkyl group via an ester group.

43. The polymeric surfactant according to claim 41, wherein the polyoxyalkylene is linked to the long-chain alkyl group via an ether group.

44. The polymeric surfactant according to claim 34, wherein the polyolefin oligomer is functionalized by reaction with a dicarboxylic acid derivative selected from acyl halides, $C_1$–$C_4$ esters and anhydrides.

45. The polymeric surfactant according to claim 34, wherein the functionalized polyolefin oligomer is obtained by reaction between maleic anhydride and a polyisobutene containing not less than 65% of exo double bonds.

46. The polymeric surfactant according to claim 34, wherein the nitrogen compound (iii) is a primary, secondary or tertiary amine of the formula:

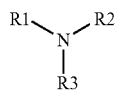

wherein R1, R2 and R3, equal or different from each other, are selected from hydrogen; $C_1$–$C_{24}$ hydrocarbyl groups, optionally substituted with at least one group selected from hydroxy and $C_1$–$C_4$ alkoxy; R1 and R2 may be linked to form a nitrogen-containing aliphatic heterocyclic ring, optionally containing at least one additional heteroatom; with the proviso that at least one of R1, R2 and R3 is different from hydrogen.

47. The polymeric surfactant according to claim 34, wherein the nitrogen compound (iii) is an alkylene polyamine of the formula:

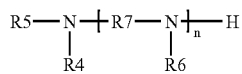

wherein n is from 1 to 10; R4, R5 and R6, equal or different from each other, are selected from hydrogen, alkyl or hydroxyl-substituted alkyl groups having from 1 to 30 carbon atoms, with the proviso that at least one of R4 and R5 and at least one of R6 is hydrogen; and R7 is an alkylene group having from 1 to 18 carbon atoms.

48. The polymeric surfactant according to claim 34, wherein the nitrogen compound (iii) is a quaternary ammonium hydroxide of the formula:

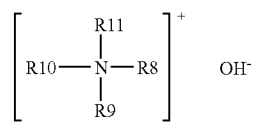

wherein:

R8, R9, R10 and R11, equal or different from each other, are selected from $C_1$–$C_{24}$ hydrocarbyl groups, optionally substituted with at least one group selected from hydroxyl and $C_1$–$C_4$ alkoxy; R8 and R9 may be linked to form a nitrogen-containing aliphatic heterocyclic ring, optionally containing at least one additional heteroatom.

* * * * *

UNITED STATES PATENT AND TRADEMARK OFFICE
CERTIFICATE OF CORRECTION

PATENT NO.        : 7,041,145 B2                                      Page 1 of 1
APPLICATION NO.   : 10/482956
DATED             : May 9, 2006
INVENTOR(S)       : Tiziano Ambrosini et al.

It is certified that error appears in the above-identified patent and that said Letters Patent is hereby corrected as shown below:

- On the title page of the above identified Patent, item (73), in the Assignee, "Technologie" should read -- Tecnologie --

- On the title page of the above identified Patent, at line 6 of the abstract, "polyoxylakylene" should read -- polyoxyalkylene --

- In claim 21, at column 15, line 11, "0.75to" should read -- 0.75 to --

-In claim 32, at column 15, line 44, "hydrocarbon said emulsion" should read -- hydrocarbon, said emulsion --

Signed and Sealed this

Fifteenth Day of August, 2006

JON W. DUDAS
*Director of the United States Patent and Trademark Office*